United States Patent [19]
Farrell

[11] 3,748,922
[45] July 31, 1973

[54] ENERGY ABSORBING STEERING COLUMN

[75] Inventor: Robert C. Farrell, Saginaw, Mich.

[73] Assignee: General Motors Corporation, Detroit, Mich.

[22] Filed: May 16, 1972

[21] Appl. No.: 253,788

[52] U.S. Cl. ................................................ 74/492
[51] Int. Cl. ............................................ B62d 1/18
[58] Field of Search ............................. 74/492, 493

[56] References Cited
UNITED STATES PATENTS

3,470,761   10/1969   Okamoto et al. ...................... 74/492

*Primary Examiner*—Milton Kaufman
*Attorney*—W. E. Finken and D. L. Ellis

[57] ABSTRACT

A dual stage energy absorbing steering column includes a support jacket unit comprised of three concentrically arranged jacket members, the inner and intermediate ones of which include a deformer ball type of energy absorber responsive to a first level of impact force on the jacket unit to collapse and absorb energy, the outer jacket member including an energy absorbing plastically deformable section generally coextensive the length of the intermediate jacket member and crushable under some other level of impact force to absorb energy, releasable shear pins engaged between such outer and intermediate jacket members and of a strength selected to effect a desired order of occurrence of energy absorption as between the two energy absorbers.

3 Claims, 4 Drawing Figures

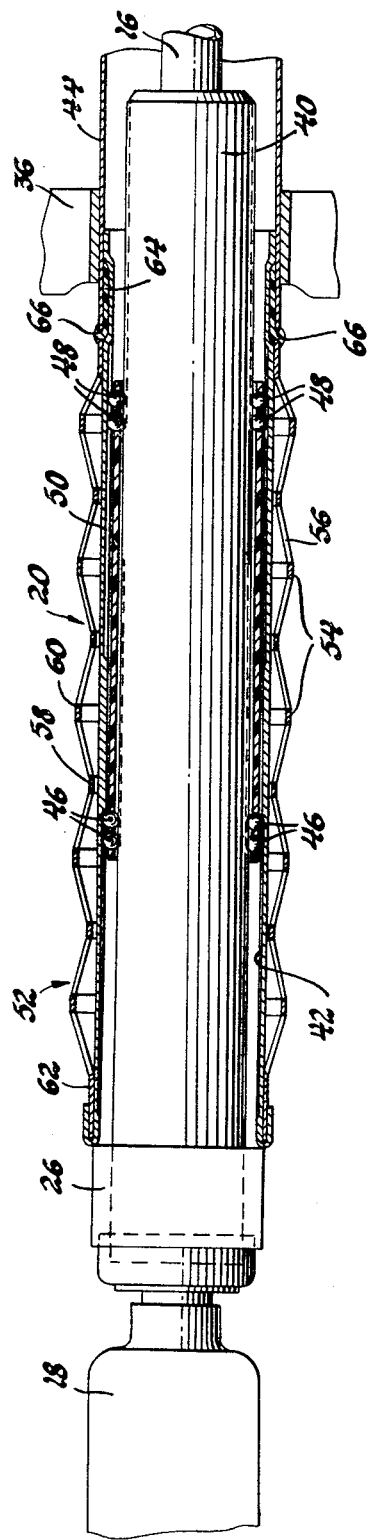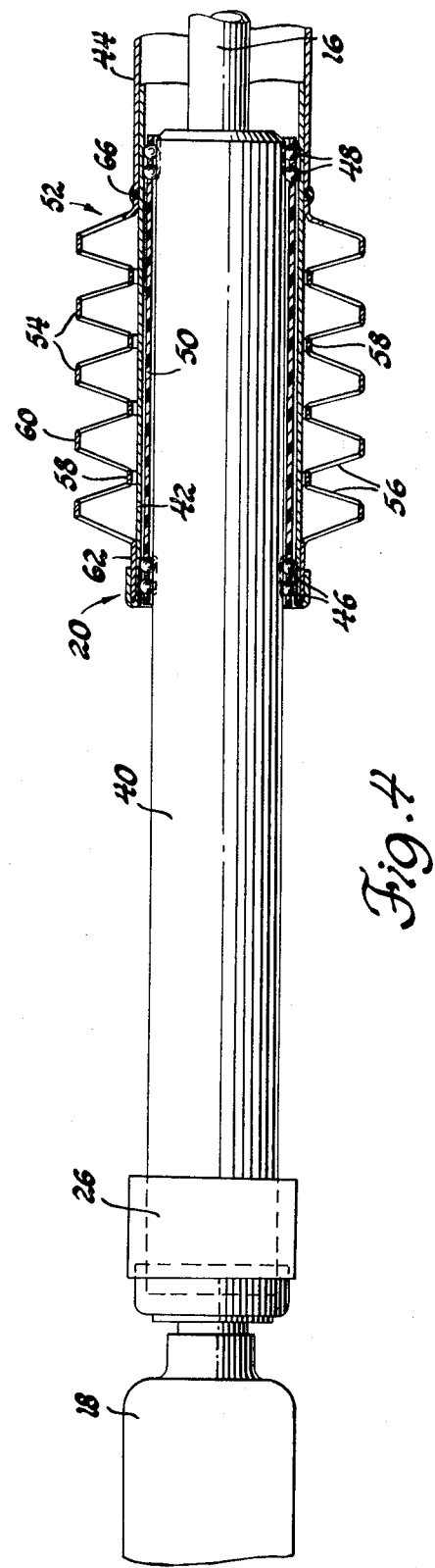

ENERGY ABSORBING STEERING COLUMN

This invention relates to energy absorbers and more particularly to impact energy absorbers for automotive steering columns and the like structured to effect two or more stages or levels of energy absorption.

In collapsible automotive vehicle steering columns and similar applications, it has been found desirable to incorporate energy absorbing structures arranged to provide staged or differing levels of energy absorption arising from differing amounts of force sustainable in the energy absorber during different portions of the displacement thereof. Such an arrangement is useful, for example, in steering columns where a first low level of force is sustained in the absorber over a first short amount of displacement in which extraneous forces such as friction and inertia also usually act briefly to resist steering column displacement, thereby to hold the total force in such first displacement portion at an acceptable value. Following the disappearance of the extraneous forces, the energy absorber is allowed to sustain a higher force to gain a maximum amount of energy absorption.

The present invention has as its principal object to provide such a staged energy absorber, particularly for use in automotive collapsible steering columns, and which further economizes on the space occupied by the column and maximizes the amount of displacement available to the energy absorber within the space occupied.

One feature of the invention is that it provides energy absorbing construction for collapsible steering columns or the like including three concentrically arranged tubular members, two of which are engaged by deformer ball or like energy absorbing construction to be operative as a telescopic assembly for a first mode of energy absorption, while an outer third member, coextensive with the next adjacent inner member, is subject to a predetermined force to provide another mode of energy absorption through crushing or foreshortening plastic deformation of its length relative to the adjacent inner member. Another feature of the invention is that a releasable interconnection is provided between the members designed to release under a force selected to effect the order of occurrence of the two energy absorbing modes of displacement within the energy absorber.

These and other features and advantages of the invention will be readily apparent from the following specification and from the drawings wherein:

FIG. 3 is a view similar to FIG. 2 showing the steering column collapse in one order of energy absorption occurrence; and FIG. 4 is a view similar to FIG. 3 showing the steering column modified to collapse in a reverse order of energy absorption occurrence.

Figure 1:
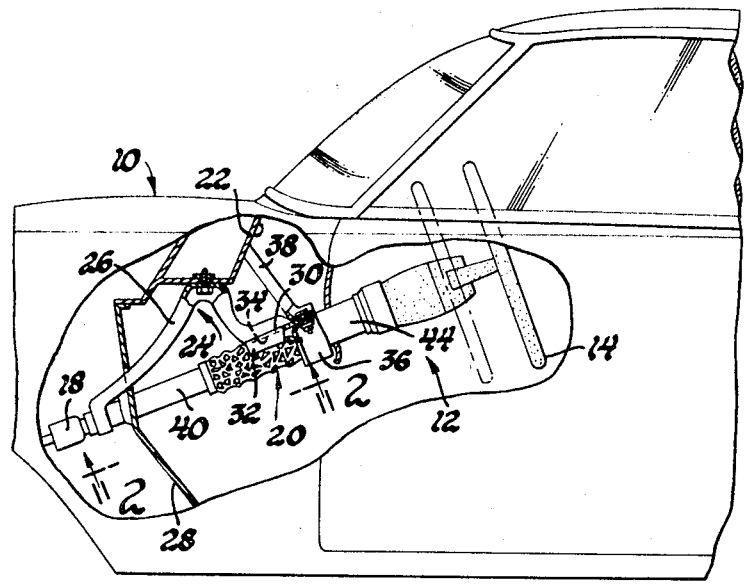
FIG. 1 is a fragmentary partially broken away elevational view of an automobile having a steering column which includes an energy absorber according to this invention.

Referring now particularly to FIG. 1 of the drawings, an automotive vehicle body 10 includes a steering column assembly 12 incorporating an energy absorber construction according to this invention. Such column assembly is of conventional type including a steering wheel 14 adapted for connection to the vehicle steering gear, not shown, by way of a steering shaft indicated at 16 in FIG. 2. Such shaft has connection at its lower end with a coupling 18 associated with an input shaft element of the steering gear. Intermediate the steering wheel 14 and coupling 18, the steering shaft is supported rotatably on the vehicle body 10 by a collapsible energy absorbing support jacket assembly 20.

Such support jacket assembly 20, and the telescopeable steering shaft therewithin, constitute a rigid column for supporting steering wheel 14 in the normal position, shown in full lines, except upon the application of some predetermined force to the steering wheel from impact by the driver's torso thereon as will be described. Thus, support jacket assembly 20 typically includes bearings therewithin, not shown, rotatably supporting the steering shaft within the support jacket assembly and the support jacket assembly is in turn mounted on the vehicle body 10, particularly the forward cowl or plenum structure thereof 22 by a steering column support bracket structure 24. Such bracket structure includes a lower portion 26 fixedly attached by screws or the like, not shown, at its lower distal end to the lower end of the support jacket assembly 20. If desired, such lower bracket portion 26 may extend through an opening in the firewall 28 of the vehicle body as shown, to provide for maximum spacing of the support jacket assembly between its lower end and a further portion 30 of bracket structure 24 adjacent the upper end of the support jacket assembly. Such upper bracket portion 30 may include a pair of laterally spaced vertically depending guide flanges 32 merging with a generally horizontal transversely extending pair of ramp portions 34 suitable for both lateral and vertical constraint to the path of forwardly collapsing movement with the support jacket assembly of a generally U-shaped column bracket 36 which may be welded or otherwise fixedly attached in conventional manner on the upper portion of the steering column support jacket assembly 20 as is known in the art. A brace member 38 depends from plenum structure 22 for connection with the upper distal end of upper bracket portion 30 for further rigidity of steering column support in known manner. The connection between the upper bracket portion 30 and the column bracket 36 is structured in a manner to have firm support of the upper portion of the steering column on plenum structure 22 during normal vehicle operating conditions, but releasable under predetermined force applied generally along the axis of the steering column and forwardly thereof to permit relative movement in that direction between the support jacket assembly 20 and its column bracket 36 from the position shown and down the guide flanges 32 and ramp portions 34. Further, such connection will not permit relative column movement in the opposite direction under forces applied to the lower end thereof from collisions causing the steering gear box to move rearwardly relative to firewall 28. Such a bracket interconnection is disclosed for example, in U.S. Pat. No. 3,476,345 to Ristau, issued Nov. 4, 1969, and assigned to the assignee of the present invention.

Figure 2:
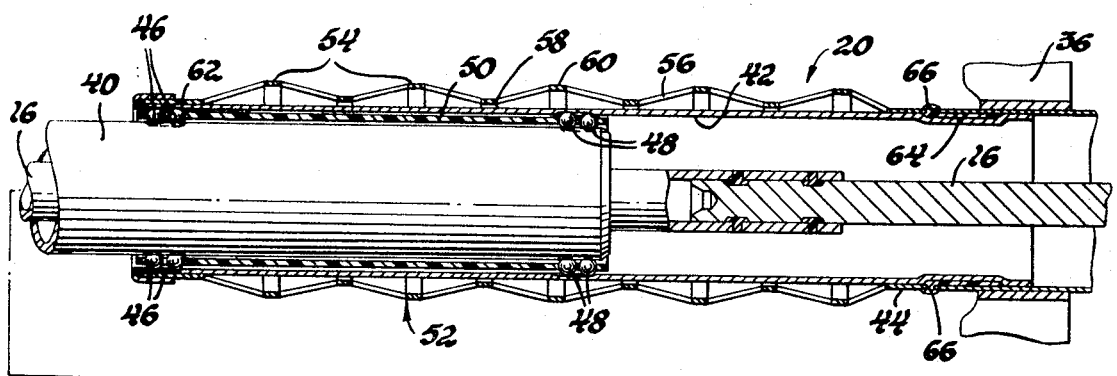
FIG. 2 is an enlarged sectional view taken generally along the plane indicated by lines 2—2 of FIG. 1.
Figure 2:
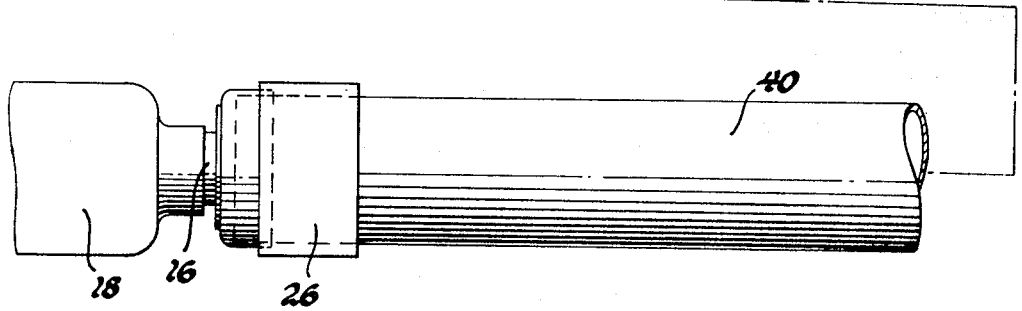

Referring now particularly to FIG. 2 of the drawings, the energy absorbing collapsible support jacket assembly 20, according to a principal feature of this invention, is constructed of three coaxially arranged tubular jacket members including a lower support jacket member 40, an intermediate jacket member 42 and an upper jacket member 44. Lower jacket 40 has lower bracket portion 26 connected to it, while upper jacket 44 extends upwardly to steering wheel 14, as best seen in FIG. 1. The three jacket members are arranged, in a manner to be described, to have separate energy absorbing collapsible functions between two distinct pairs therewithin; i.e., a first collapsible energy absorbing mode between lower jacket 40 and intermediate jacket 42 and a second collapsible energy absorbing mode between intermediate jacket 42 and upper jacket 44. In this way the steering column support jacket 20 may be designed conveniently to exhibit staged levels of energy absorption and forward collapse under the application of some predetermined impact force on steering wheel 14 sufficient to release the interconnection between upper bracket portion 30 and column bracket 36. Such staged energy absorption is useful to control the amount of force sustained in the steering column and on the driver's torso over the entire collapse distance necessary to dissipate the energy of the impact. It is particularly useful in providing a first mode of energy absorption at a low level of sustained force during the initial brief time period of collapse of the column when such additional extraneous forces as friction in the brackets and inertia of the upper steering column portion are resisting forward movement of the latter. To avoid these forces causing too high total force sustained in the column during collapse, the first mode of energy absorption and force sustained in the first mode energy absorber is made relatively low. Following this brief initial period and the disappearance of the extraneous forces, the second energy absorbing mode may come into play at a force level generally equal to that total force exhibited in the first initial period of collapse. Thus, a "square wave" characteristic may be embodied in the steering column including the combined energy absorbing unit where a maximum force presented to the driver's torso is kept at a generally constant level, which of course maximizes the total energy dissipated.

The first energy absorbing mode may be accomplished by incorporation of a deformer ball type energy absorber including lower jacket 40 and intermediate jacket 42. Such an energy absorber is described in detail in U.S. Pat. No. 3,392,599 to White, issued July 16, 1968, and assigned to the assignee of the present invention. Reference should be had to that patent for a complete understanding of the absorber but generally it includes axially spaced annular rows or groupings of deformer balls 46 and 48 interposed between jackets 42 and 44 with a predetermined interference fit. Thus, each of the balls 46 and 48 are predeterminedly larger than the annular gap between the outer cylindrical surface of the lower jacket 40 and the inner cylindrical surface of the intermediate jacket 42. Further, balls 46 and 48 are predeterminedly harder than the material of the walls of either or both of such jackets. When assembled between such jackets, as shown in FIG. 2, the balls 46 and 48 are subject during telescopic displacement between the jackets to roll over the walls thereof and plow or furrow grooves therein by localized plastic strain in the walls. All of the balls 46 and 48 accordingly roll grooves extending approximately half the distance of the relative collapsing displacement between jackets 40 and 42 and preferably roll such grooves at different circumferential points about the walls of the jackets by properly angularly spacing the balls so that no two rolling longitudinal pathways of any of the balls 46 and 48 will coincide. 62 absorbing The second mode of energy absorption may be achieved, as illustrated herein, by constructing upper jacket 44 as an axially crushable member subject to controlled plastic deformation and foreshortening under the application of predetermined force axially therethrough. The upper jacket 44 may thus include a crushable energy absorbing portion 52 formed of an axial series of radially expanded corrugations 54 extending from adjacent a fairly short cylindrical or uncorrugated section at the jacket lower end upwardly toward the upper end of intermediate jacket 42. Such energy absorbing structure is disclosed in U.S. Pat. No. 3,373,629 to Wight et al., issued Mar. 19, 1968 and assigned to the assignee of the present invention. As disclosed in detail therein, energy absorbing portion 52 may be formed from a tubular blank in which diamond shaped perforations are provided to define a lattice of interconnected strips thereby to further intentionally weaken the energy absorbing portion 52 so as to be subject to collapse in controlled manner under some predetermined axial force after the annular corrugations 54 are provided therein. The corrugations define localized bending areas adjacent the end points 58 and 60 of each of the sides of each corrugation formed in energy absorbing portion 52 by the perforations therein. Each of the corrugations 54 are subject, upon application of predetermined axial force, to expand further radially outwardly and bend the strips 56 in the lattice formation therewithin by plastic deformation to dissipate the energy of collapse.

The three jacket members 40, 42 and 44 are assembled in a manner to effect a desired order of energy absorption and collapse as between the two distinct pairs within such set of jackets. Thus, the lower cylindrical end 62 of upper jacket 44 is fixedly secured to intermediate jacket 42 by reversely bending the lower marginal end of the latter over jacket end 62. Relative movement between the joined portions of these jackets is thus prevented when downwardly directed axial force is applied to upper jacket 44. If desired, jacket end 62 may be welded at this interconnection with intermediate jacket 42.

Adjacent the upper end of intermediate jacket 42, a releasable shear pin connection is provided between it and upper jacket 44 above the energy absorbing portion 52 of the latter. Such shear pin structure is provided by forming an annular depression 64 in the wall of the upper end of intermediate jacket 42 and a series of perforations 66 in upper jacket 44 communicating with depression 64. Thermoplastic or like material may then be injected through perforations 66 to fill the latter and the annular depression 64 by molding in situ. When cured, the portion of the molded plastic structure within perforations 66 provide shear pins frangible under predetermined axial load sustained in jackets 42 and 44 to allow forward displacement of the upper jacket 44 relative to the intermediate jacket 42.

As mentioned, this releasable interconnection features a selected order of occurrence of the energy absorption available in the two distinct energy absorbing structures provided by deformer balls 46 and 48 on the one hand, and the energy absorbing portion 52 on the other. As mentioned, both such energy absorbing structures will remain in their uncollapsed condition until some predetermined axial force is applied thereto. This fact, in conjunction with a selection of the strength of the plastic shear pins, as by choice of material or cross-sectional size of perforations 66, is utilized to cause staged collapsing and energy absorption between the two energy absorbers independently of one another. One order of occurrence of such energy absorption is illustrated in FIG. 3 where the strength of the plastic shear pins is selected to resist axial force applied to steering wheel 14 at a level higher than that which can be resisted by deformer balls 46 and 48 without rolling. In this case, the interference fit of deformer balls 46 and 48, as adequately explained in the above mentioned White patent, is selected such that a first low level of predetermined force will cause these balls and sleeve 50 to displace and plow grooves in the two jacket members 40 and 42 and permit telescopic collapse therebetween. The maximum amount of such collapse is particularly illustrated in FIG. 3 where it is seen that the unit comprised of upper jacket 44 and intermediate jacket 42 is telescopically displaced to abut the lower jacket end 62 and the lower end of jacket 42 against the collar formation on the lower support jacket portion 26. Further such telescoping is thus prevented and if further energy is to be absorbed, the force sustained in the steering column immediately rises as a step function to that predetermined force which will collapse energy absorbing portion 52. The strength of the shear pins is preferably set significantly below this last mentioned predetermined force so that load is immediately applied to energy absorbing portion 52. Upon the attainment of the predetermined force sustainable in such portion, this portion collapses in controlled manner and allows relative displacement of the upper jacket 44 relative to the two jackets 40 and 42 which are in effect grounded upon the vehicle plenum structure 22 by lower bracket portion 26. This higher level of energy absorption and force sustainment will continue until the energy absorbing portion 52 is fully collapsed as described in the Wight et al patent.

An alternative order of occurrence of energy absorption is illustrated in a modification shown in FIG. 4. There, the predetermined collapse resistance of energy absorbing portion 52 and the plastic shear pins have been designed to be of a strength lower than the effective strength or resistance to rolling of balls 46 and 48. Accordingly, upon application of a predetermined low load, the steering wheel 14 and the shear pins fracture and force application at the level predetermined for collapse of energy absorbing portion 52 causes such collapse and displacement of upper jacket 44 relative to the stationary unit comprised of lower jacket 40 and intermediate jacket 42 which is grounded on the vehicle plenum structure 22. If impact energy remains following full collapse of energy absorbing portion 52, the load sustained in the steering column rises immediately to that which will begin rolling of balls 46 and 48, whereupon a second stage of higher energy absorption and load sustainment is effected in accordance with some selected interference fit characteristic of the assembly including balls 46 and 48. This interference fit is of course greater, with relation to the strengths of the plastic shear pins and energy absorbing portion 52, than is the case in the embodiment of FIG. 3.

In accordance with another feature of this invention, it is seen that upper jacket 44 coextends at least the full length, and is preferably longer than the intermediate jacket 42. The energy absorbing portion 52 is, as illustrated here, generally coextensive the length of such intermediate jacket but may be shorter if desired, particularly in the case of the FIG. 4 embodiment where this portion provides the initial energy absorption mode. At any rate, by having the lower end of upper jacket 44 connected to the lower end of jacket 42 in the described manner, a maximum amount of total displacement is available to the support jacket assembly 20 without unduly extending the uncollapsed length thereof as indicated in FIG. 1. A suitable amount of energy absorption, at suitable load levels, is thus provided for the vehicle occupant without sacrificing the room available to him between steering wheel 14 and his seat in the vehicle passenger compartment during regular conditions. Further, this coextensive arrangement for upper jacket 44 will rigidify the support jacket assembly even though an intentionally weakened portion 52 is provided in one of the members thereof, the intermediate jacket 42 serving to transfer to the upper jacket the rigidity present in the connection made by balls 46 and 48. This can be assured by firm engagement between these two jackets at the uncorrugated areas of the upper jacket, including the shear pin strucutre therebetween.

Having thus described the invention, what is claimed is:

1. An energy absorber comprising a first tubular member, a second tubular member surrounding said first member and forming with the latter a telescopeable assembly, energy absorbing means connected between said first and second members and operative upon the application of predetermined force in a direction causing telescoping movement of such members to provide a first mode of energy absorption, a third tubular member surrounding said second member and at least coextensive therewith, means connecting one end portion of said third member with said second member against relative movement therebetween in said one direction, said third member including an energy absorbing portion subject upon the application of a predetermined force in said one direction to controlled plastic deformation for axial shortening of said third member in said one direction toward said one end portion thereof to provide a second mode of energy absorption, and releasable means connecting said third member with said second member against relative movement therebetween and releasable under a predetermined force selected to effect the order of occurrence of said first mode energy absorption and said second mode energy absorption.

2. An energy absorber comprising a first tubular member, a second tubular member surrounding said first member and forming with the latter a tleescopeable assembly, a plurality of deformer balls engaged between said first and second members with predetermined interference fit so that upon the application of predetermined force in a direction causing telescoping movement of such members said balls roll over the walls of such members and plastically deform such walls for a first mode of energy absorption, a third tubular member surrounding said second member and coextensive therewith, means connecting one end portion of said third member with said second member against relative movement therebetween in said one direction, said third member upon the application of a predetermined force in said one direction being subject to controlled plastic deformation for axial shortening of said third member in said one direction toward said one end protion thereof for a second mode of energy absorption, and releasable means connecting the other end portion of said third member with said second member against relative movement therebetween and releasable under a predetermined force selected to effect the order of occurrence of said first mode energy absorption and said second mode energy absorption.

3. In an energy absorbing collapsible steering column for automotive vehicles including a steering shaft interconnecting a steering wheel operable by the vehicle operator and the vehicle steering gear, support jacket means comprising a first lower support jacket member, a second lower support jacket member surrounding said first member and forming with the latter a telescopeable assembly, a plurality of deformer balls engaged between said first and second members with predetermined interference fit so that upon the application of predetermined force in a direction causing telescoping movement of such members said balls roll over the walls of such members and plastically deform such walls for a first mode of energy absorption, a third support jacket member surrounding said second member and extending to said steering wheel to support the same and the adjacent end of said steering shaft on the vehicle, at least coextensively therewith, means connecting one marginal end of said third member with said second member against relative movement therebetween in said one direction, said third member including an energy absorbing portion extending from said marginal end of said third member and confined within a distance of the latter defined between the ends of said coextensive second member, said energy absorbing portion upon the application of a predetermined force in said one direction being subject to controlled plastic deformation for axial shortening of said third member in said one direction toward said one marginal end thereof for a second mode of energy absorption, and releasable means connecting the other end portion of said third member with said second member and releasable under a predetermined force selected to effect the order of energy absorption between that of said first mode energy absorption and said second mode energy absorption.

* * * * *